Figure 1:
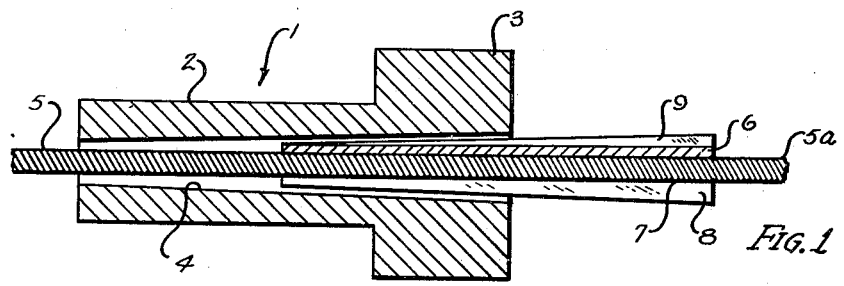

Sept. 1, 1942.  R. M. FERGUSON  2,294,398

TERMINAL FITTING FOR FLEXIBLE OR SEMI-FLEXIBLE CABLE

Filed Dec. 10, 1940

INVENTOR
RALPH M. FERGUSON
BY
ATTORNEYS

Patented Sept. 1, 1942

2,294,398

UNITED STATES PATENT OFFICE 2,294,398

TERMINAL FITTING FOR FLEXIBLE OR SEMIFLEXIBLE CABLE

Ralph M. Ferguson, Dayton, Ohio

Application December 10, 1940, Serial No. 369,435

4 Claims. (Cl. 24—126)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a terminal fitting for twisted strand flexible or semi-flexible metal cable, or wire rope and is of particular value in serving as a terminal fitting on the flexible and semi-flexible cables employed in aircraft and the like.

Cable terminals of the type comprising an annular sleeve serving as an anchoring element and having an internal tapered passage therein adapted to receive one or more wedging elements which enclose the cable and frictionally grip the cable when driven into the sleeve, have long been known in the prior art. Such prior art terminals, however, have the disadvantage, that the ultimate tension load to which such a fitting can be subjected is determined by the friction developed between the wedges and the cable, which friction is a variable of uncertain magnitude, so that such a terminal may not be depended upon to carry loads approaching the ultimate tensile strength of the cable.

To remedy the above noted defect it has been suggested in the prior art, that the portions of the wedging elements which contact the cable be formed with teeth, or serrations, to grip the cable, which obviously under heavy repeated loads will cut through and fray the cable strands. A further suggestion in the prior art was to preform the surface of the wedging elements contacting the cable, with grooves corresponding to the form of the twisted strands of the cable, which construction while satisfactory from a strength standpoint, requires the use of different dies for each form and diameter of cable for preforming the groves in the wedging elements and making the cost of such a construction prohibitive.

The present invention provides a cable terminal which is cheap to produce and is capable of consistently carrying loads in excess of 85 per cent of the ultimate tensile strength of the cable. The cable terminal comprises an annular sleeve having a tapered bore adapted to receive an exteriorly tapered core member, which is provided with a cable receiving passage therein. The core member is provided with one or more longitudinally extending slots, which permit the core member to contract and grip the cable when the core is driven into the annular sleeve member. The core member is made so that at least the material thereof in contact with the cable is softer than the material of the cable, so that as the core member is compressed around the cable, the cable strands will imbed themselves in the walls of the cable receiving passage, thus forming grooves in the walls of the passage of the core member corresponding to the lay of the cable strands and resembling screw threads. The shearing strength of the root portions of the material between the grooves is the limiting factor determining the ultimate load of the terminal fitting and thus making it possible for the fitting to develop loads approaching the ultimate tensile strength of the cable.

The principal object of the invention is the provision of a terminal fitting for twisted strand metallic cable and the like, comprising a body member having a tapered longitudinal passage therethrough, an exteriorly tapered annular core member including one or more wedging elements adapted to be inserted and wedged in the tapered passage of said body member, said core member being adapted to surround the cable; and the material adjacent the surface of the walls of said core member in contact with the cable, being softer than the material of the cable, whereby the core member when inserted with the cable into the body member, compresses the cable and causes the outer strands thereof to become partially imbedded in the walls of the cable receiving passage in said core member.

Figure 2:
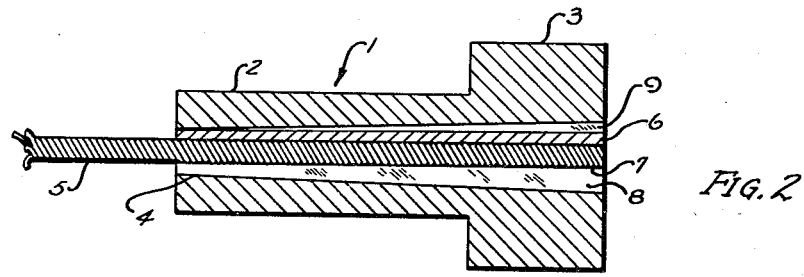
Figure 3:
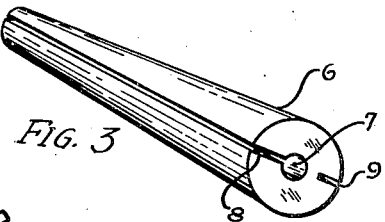
Figures 4, 5:
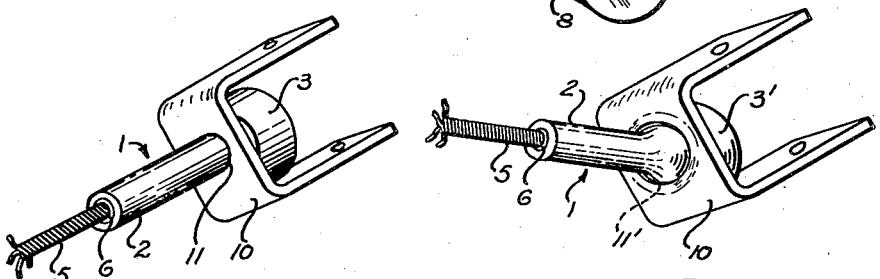

Other objects of the invention will appear by reference to the detailed description in the specification and to the appended drawing in which:

Fig. 1 is a longitudinal sectional view of the novel cable terminal with the parts arranged for assembly; and Fig. 2 is a view similar to Fig. 1, showing the parts in assembled relation; and Fig. 3 is a perspective view of the tapered core member illustrated in Figs. 1 and 2; and Fig. 4 is a perspective view illustrating the manner in which the cable terminal of Fig. 1 is secured to an anchoring fitting; and Fig. 5 is a view similar to Fig. 4, but illustrating the cable terminal of Fig. 1, modified to form a semi-universal cable connection to the anchoring fitting.

Referring now to Figs. 1 to 3 inclusive, the reference numeral 1 generally indicates an annular sleeve or body member having a reduced diameter portion 2 and an enlarged head portion 3, the latter adapted to engage an anchoring fitting. The body or sleeve portion 1 is provided with a tapered internal longitudinally extending passage 4, which surounds the twisted strand cable 5 and is adapted to receive the externally tapered core member 6. The core member 6 has a uniform diameter passage 7 extending longitudinally therethrough for receiving the cable 5, which is inserted therein. The core member 6 is provided with a longitudinally extending slot 8 which extends through from the outer surface of the core member into the longitudinal passage 7 thereof and, is similarly slotted diametrically opposite as at 9, except that the slot 9, does not extend through the core member to the cable receiving passage 7 (see Fig. 3).

The sleeve or body member 1, is preferably made of a hard tough steel, while the core member 6 is made of a soft steel, which if desired may have its outer surface case hardened, but in all events must have the material forming the surface of the walls of the longitudinal passage 7 in contact with the cable, softer than the material of which the cable is formed. In actual practice it has been found that commercial soft steel taper pins form a suitable low cost material for making the core members.

The diameter at the small end of the tapered passage 4 in the body member 1 is made slightly smaller than the initial diameter of the small end of the core member 6, so that the core member, which in effect comprises two connected wedge elements, will close as the core member is driven into the body member, the wedge elements moving radially inward with respect to each other. The longitudinal passage 7 is initially bored to a diameter such that the particular cable to be anchored, can be inserted therein.

The relation of the various parts before final assembly is as illustrated in Fig. 1, the twisted strand cable 5, being passed through the tapered passage 4 of the sleeve member 1. The tapered core member is then slipped on the cable with a small amount of the cable 5 projecting beyond the outer end of the core member; and the core member is then inserted into the tapered passage 4 of the body member and driven home with a suitable tool and the projecting portion 5a of the cable cut off leaving the elements in the assembled condition as seen in Fig. 2. As the core member is driven into the body member the wedging elements of the core member compress the cable 5, so that when the parts are in the assembled position (Fig. 2), the outer surface strands of the cable 5 will become partially imbedded in the walls of the passage 7 of the core member, securely locking the cable to the core member and resisting by shear, tension stresses on the cable.

As seen in Fig. 4, the cable terminal is secured to an anchoring fitting or U clip 10, by inserting the cable 5 and the reduced diameter portion 2 of the sleeve 1 through the aperture 11 formed in the fitting 10, the enlarged head portion 3 of the sleeve then engaging the fitting and transmitting tension stresses from the cable into the fitting.

Fig. 5 illustrates a form of connection employed where it is desired to provide for relative movement between the cable terminal and the anchoring fitting and in this modification the enlarged head 3', of the sleeve 1, is rounded in the form of a ball which is seated in the complementary formed edges of the aperture 11' of the anchoring fitting 10, which thus permits a limited universal movement of the cable and associated terminal, relative to the anchoring clip 10.

While in the drawing the tapered passage 4 is illustrated as circular in cross section, it need not necessarily be made of such a shape and further while the core member 6 is illustrated as a circular tapered member slotted to form connected relatively movable wedging elements, it is obvious that the wedges may be separate elements of rectangular cross section with half round grooves which in assembled relation form an enclosure for the cable 5. The main criterion of the invention is that the material in immediate contact with the cable be softer than the material of the cable.

While a preferred form of the invention has been illustrated, other modifications and changes will be apparent to those skilled in the art as falling within the scope of the invention as defined by the appended claims.

I claim:

1. A terminal fitting for twisted strand cable and the like, comprising an outer sleeve member having a tapered longitudinally extending passage therethrough, an exteriorly tapered, radially deformable core member having a length substantially equal to the length of the passage in said sleeve member, and the taper of said core member corresponding to the taper of the passage in said sleeve member, the radial dimensions of said core member being in excess of the corresponding dimensions of the tapered passage in said sleeve, a central, longitudinally extending passage in said core member having initial radial dimensions such that the cable may be passed therethrough, and the material of said core member being softer than the material of said cable, whereby when said sleeve and core member are slipped over the cable and the core member driven into the sleeve member as a wedge, the compressive stresses exerted on the cable by radial deformation of the core member will cause the strands on the cable surface to become partially embedded in the walls of the cable-receiving passage in the core member, to thereby anchor the cable against slippage relative to the core member and sleeve.

2. A terminal fitting for twisted strand cable and the like, comprising an outer sleeve member having a tapered longitudinally extending passage therethrough, an exteriorly tapered, radially deformable core member having a length substantially equal to the length of the passage in said sleeve member, and the taper of said core member corresponding to the taper of the passage in said sleeve member, the radial dimensions of said core member being in excess of the corresponding dimensions of the tapered passage in said sleeve, a central, longitudinally extending passage in said core member having initial radial dimensions such that the cable may be passed therethrough, the said core member being provided with one or more longitudinally extending slots, and the material of the walls of the passage in said core member being softer than the material of said cable, whereby when said sleeve and core member are slipped over the cable and the core member driven into the sleeve member as a wedge, the compressive stresses exerted on the cable by radial deformation of the core member will cause the strands on the cable surface to become partially embedded in the walls of the cable-receiving passage in the core member to thereby anchor the cable against slippage relative to the core member and sleeve.

3. A terminal fitting for twisted strand cable and the like, comprising an outer metal body member having a tapered passage extending longitudinally therethrough, an exteriorly tapered core member having a length substantially equal to the length of the passage in said body member, with a taper corresponding to the taper of the passage in said body member, the radial dimensions of said core member being in excess of the corresponding dimensions of the tapered passage in said body member, a cable-receiving passage extending longitudinally through said core member and having an initial diameter so that the cable may be passed therethrough, and the material of the walls of the cable-receiving passage being softer than the material of the cable to be received therein, a plurality of longitudinally extending grooves in said core member, at least one of said grooves extending from the outer periphery of said core member to the cable-receiving passage therein, whereby when said body member and said core member are slipped over the cable and the core member driven into the body member as a wedge, the compressive stresses exerted on the cable by radial deformation of the core member will cause the strands on the cable surface to become partially embedded in the walls of the cable-receiving passage in the core member to thereby prevent relative longitudinal movement between the cable and said core member.

4. A terminal fitting for twisted strand cable, comprising a body member adapted to be anchored to a support, a tapered passage in said body member, a wedge comprising a plurality of exteriorly tapered, radially movable elements having a taper corresponding to the taper of the passage in said body member and having a length substantially equal to the length of said passage, said elements forming an assembly having radial dimensions in excess of the corresponding dimensions of the passage in said core member, a central cable-receiving passage formed by the elements of said wedge and having initial radial dimensions such that the cable may be passed therethrough, and the material of the walls of said cable-receiving passage being softer than the material of the cable, whereby when the cable is inserted in said cable-receiving passage and the wedge driven into said body member, the compressive stresses exerted on the cable by the radial movement of the wedge elements will cause the outer strands of the cable to become partially embedded in the walls of the cable-receiving passage to thereby prevent relative longitudinal movement between the cable and the wedge.

RALPH M. FERGUSON.